April 1, 1952
R. B. CURTIS
2,590,945
TRUNK CIRCUIT
Filed Oct. 31, 1950
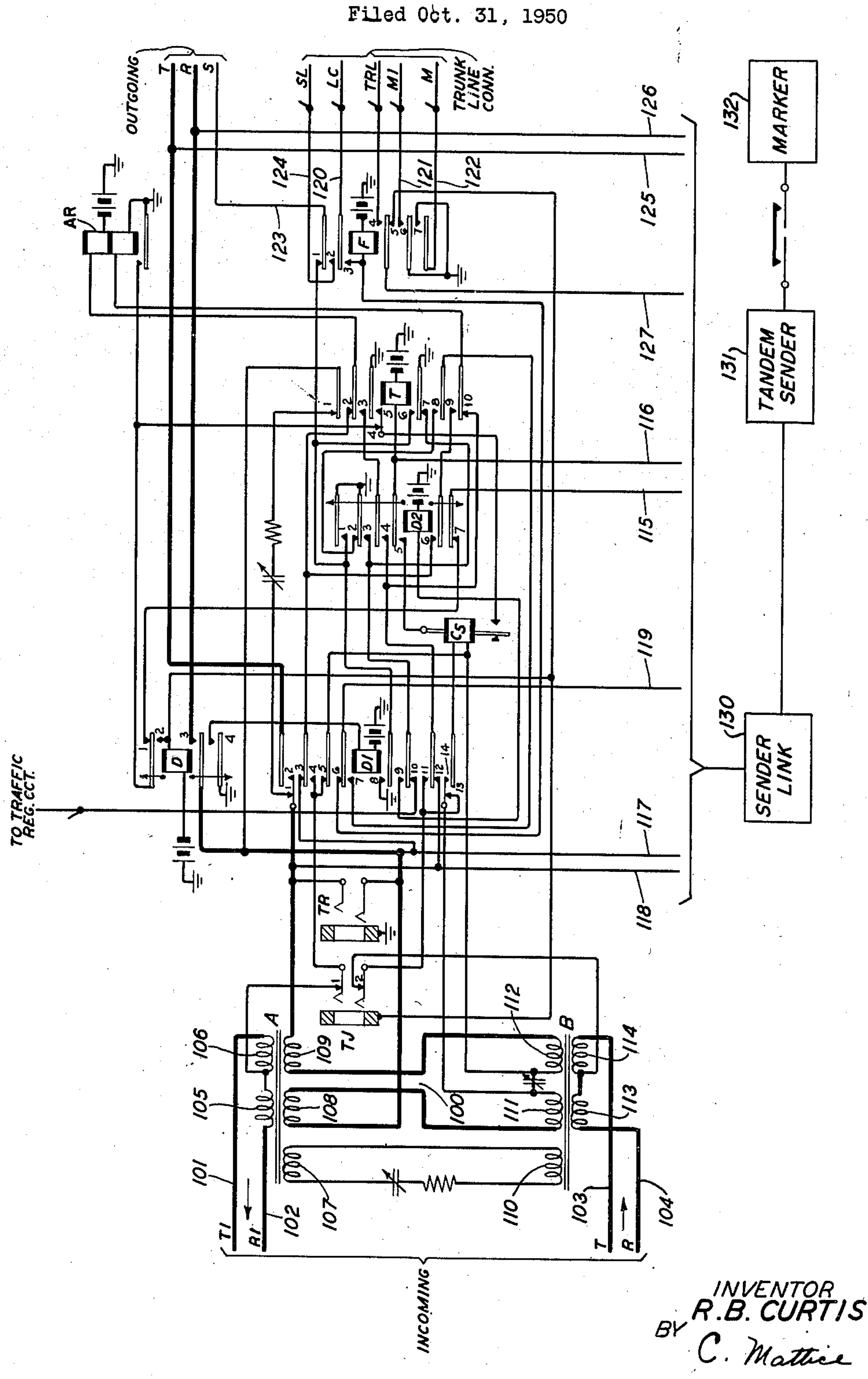
INVENTOR
R. B. CURTIS
BY C. Mattice
ATTORNEY Patented Apr. 1, 1952

2,590,945

UNITED STATES PATENT OFFICE 2,590,945

TRUNK CIRCUIT

Robert B. Curtis, Bethlehem, Pa., assignor to Bell Telephone Laboratories, Incorporated, New York, N. Y., a corporation of New York Application October 31, 1950, Serial No. 193,263

6 Claims. (Cl. 179—16)

This invention relates to telephone systems and has for its object to facilitate supervision between offices of different types.

More and more toll trunks and switching equipment are of the four-wire type, such as shown in Patent 2,382,893 to McKim and Myers, August 14, 1945, while local trunks and switching equipment are of the two-wire type. Since tandem exchanges are chiefly used in interconnecting local offices, the switching equipment at such exchanges is also of the two-wire type. Therefore, when a call must be extended from a four-wire toll office through a tandem office to a local office, a special type of trunk circuit is required to connect the toll office with the tandem office, which may conveniently be located at the tandem office.

In accordance with the present invention a trunk circuit for connecting a four-wire trunk with a two-wire trunk is provided with a hybrid coil for constituting a talking connection between the trunks, an incoming supervisory relay and an outgoing supervisory relay, the hybrid coil being normally connected only to the incoming supervisory relay, but connected to both supervisory relays during conversation.

The hybrid coil has a set of incoming windings and a set of outgoing windings, both sets being connected to the incoming trunk and incoming supervisory relay when the trunk is idle and means is provided when the trunk is made ready for conversation to switch the outgoing set of windings to the outgoing trunk and outgoing supervisory relay.

These and other features of the invention will be more readily understood from the following description taken in connection with the drawing which shows a trunk circuit embodying the invention. For a disclosure of a tandem sender suitable for use with this trunk circuit reference may be made to Patent 2,281,636 to W. B. Strickler, May 5, 1942.

At the left of the drawing is shown hybrid coil 100, having four incoming windings 105, 106, 113 and 114, four outgoing windings 108, 109, 111 and 112, and two balancing windings 107 and 110. Windings 105 to 109 are wound to constitute one transformer A while windings 110 to 114 are wound to constitute a second transformer B.

When the incoming sender at the toll office is connected to the outgoing toll trunk circuit at the outgoing end of the incoming tandem trunk under consideration, the outgoing toll trunk, in response to signals from the toll sender, connects, in effect, its polar supervisory relay from conductor 101 and 102 in parallel to conductors 103 and 104 in parallel. A circuit is thereby completed from ground through the lower winding of incoming supervisory relay AR over contact 10 of relay T, contact 12 of relay D1, conductor 118, outgoing windings 109 and 112 of coil 100, contact 5 of relay D1, contact 1 of jack TJ, incoming winding 106 of coil 100 and conductor 101 in parallel with incoming winding 105 of coil 100 and conductor 102, polar supervisory relay in outgoing toll trunk circuit, conductors 103 and 104 in parallel through incoming windings 114 and 113 of hybrid coil 100, contact 2 of jack TJ, contact 13 of relay D1, outgoing windings 111 and 108 of coil 100, conductor 117, contact 3 of relay D1, contact 2 of relay T, through the upper winding of incoming supervisory relay AR to battery.

Relay AR operates in this circuit closing a circuit from ground over its contact, contact 1 of relay D contact 7 of relay D2 to start conductor 115 leading to the sender link 130 which functions to select an idle tandem sender 131 and connect it with the trunk circuit.

When the sender 131 is attached to the trunk it connects ground to conductor 116, operating relay T, and connects battery and ground to conductors 117 and 118. Relay T, when operated, disconnects relay AR from the incoming trunk, placing the trunk under the control of the sender.

At the toll office, the incoming sender responds to the completion of the circuits for relay AR to prepare for sending out multifrequency pulses. The connection of battery and ground to conductors 117 and 118 by the tandem sender 131 maintains the toll sender in this condition.

When the tandem sender 131 is ready to receive pulses, it reverses the connection of battery and ground to conductors 117 and 118 as a signal to the toll sender which now proceeds to send out the multifrequency pulses representing the digits of the designation of the wanted line.

These digits are registered in the tandem sender 131. Following the registration of the first two or three digits, the tandem sender 131 calls in a tandem marker 132 which, in turn, seizes the trunk frame having access to the desired outgoing trunks. The marker then seizes the trunk link and connector frame associated with this trunk and causes the sender 131 to connect ground to conductor 119.

The connection of ground to conductor 119 completes a circuit over contact 6 of relay D1, to battery through the winding of relay F. Relay F operates and extends its operating ground over its contact 3 to conductor 120, leading to the trunk link connector and thence to the marker as an indication that the connection between the trunk and the marker has been completed. Relay F also connects ground over its contacts 6 and 7 to conductors 121 and 122 to operate the select magnets of the trunk switch. In addition at contact 2 it connects conductor 123 leading to the sleeve contact of the trunk switch to conductor 124 to permit the marker to test the connection with the outgoing trunk after it has been established. When the marker has completed its functions, relay F is released and ground is connected over contact 6 of relay T and contact 1 of relay F to conductor 123 to hold the switches connecting this trunk with the outgoing trunk.

After the outgoing connection has been established the designation is transmitted to the local office over conductors 125 and 126.

When the transmission of the designation has been completed, the tandem sender 131 connects ground to conductor 127, completing a circuit over contact 5 of relay F to battery through the winding of relay D. Relay D operates and in turn operates relay D1. At its contact 1, relay D disconnects the start conductor 115 from the contact of relay AR.

Relay D1, in operating, at its contact 8 connects ground to conductor 123, at its contact 6 opens the circuit over which relay F was operated and, at its contact 7, closes a circuit from ground at contact 2 of relay D2, contact 8 of relay T, contact 7 of relay D1 to conductor 119 as an indication that the transmission circuit has been closed, to which indication the tandem sender 131 responds by disconnecting ground from conductor 116, permitting relay T to release.

With relay T released, incoming conductors 101 and 102 are connected through input windings 106 and 105 of hybrid coil 100 in parallel, contact 1 of jack TJ, contact 4 of relay D1, contact 2 of relay T, upper winding of relay AR to battery. Conductors 103 and 104 are connected through input windings 114 and 113 of hybrid coil 100 in parallel, contact 2 of jack TJ, contact 11 of relay D1, contact 10 of relay T, lower winding of relay AR to ground. Relay AR now operates through the input windings of hybrid coil 100 and closes a locking circuit for relay D.

With relays D and D1 operated, outgoing conductor 125 is connected over contact 2 of relay D1, output windings 109 and 112 of hybrid coil 100, winding of outgoing supervisory relay CS, contact 14 of relay D1, output windings 111 and 108 of hybrid coil 100, contact 3 of relay D to outgoing conductor 126. However, relay CS is polarized and the initial flow of current in this circuit is in the non-operate direction.

The release of relay T also removes ground from conductor 119, causing the sender link 130 to release and disconnect sender 131 from the trunk. In addition, relay T released closes a circuit from ground over its contact 7, contact 9 of relay D1 to battery through the winding of relay D2.

Relay D2 operates and closes a locking circuit for itself at its contact 3 under the control of relay D1 but independent of relay T. Relay D2 also connects ground over its contact 1 to conductor 123.

When the connection is completed at the local office and the called subscriber answers, the direction of current flow in the circuit of relay CS is reversed and that relay operates. With relay CS operated a circuit is closed from ground at the contact of relay AR, contact 4 of relay T, contact of relay CS, contact 5 of relay D2 to battery through the winding of relay T. Relay T operates and locks to ground at its contact 5 independent of relay AR.

With relay T operated the circuit over conductors 101 and 102 extends as above traced to contact 4 of relay D1 and thence over contact 6 of relay D2 and contact 9 of relay T to the lower winding of relay AR and ground, while the circuit over conductors 103 and 104 extends as above traced to contact 11 of relay D1 and thence over contact 4 of relay D2, contact 3 of relay T, to the upper winding of relay AR and battery. Therefore, the connection of battery and ground to the toll trunk supervisory circuit is reversed to indicate to the toll office that the call has been answered. The talking currents are transmitted from the incoming trunk to the outgoing trunk by means of the transformers A and B which make up the hybrid coil 100.

If the called line is busy, relay CS is operated intermittently and relay T operates and releases, to repeatedly reverse the connection of battery and ground to the incoming supervisory circuit.

When the called subscriber disconnects at the end of the conversation, relay CS releases in turn releasing relay T to restore the connection of battery and ground to the incoming trunk conductors as a release signal.

When disconnection takes plate at the toll office, relay AR releases, in turn releasing relays D, D1 and D2. The release of relay D2 releases relay T if that relay is still operated, restoring the trunk circuit to normal. Relay D2 is slow to release so that the outgoing trunk conductors will be opened at contacts of relay D1 before ground is removed from conductor 123 to release the trunk switches.

What is claimed is:

1. In a telephone system, a trunk circuit, a four-wire trunk incoming to said trunk circuit, a two-wire trunk outgoing from said trunk circuit, a hybrid coil for constituting a talking connection between said incoming trunk and said outgoing trunk, said hybrid coil having a set of incoming windings, a set of outgoing windings and a set of balancing windings, an incoming supervisory relay, an outgoing supervisory relay, means for normally connecting said incoming trunk through said incoming and outgoing windings to said incoming supervisory relay, and means for connecting said incoming trunk to said incoming supervisory relay independent of said outgoing windings and for connecting said outgoing windings to said outgoing trunk and said outgoing supervisory relay.

2. In a telephone system, a trunk circuit, a four-wire trunk incoming to said trunk circuit, a two-wire trunk outgoing from said trunk circuit, a hybrid coil for constituting a talking connection between said incoming trunk and said outgoing trunk, said hybrid coil having a set of incoming windings, a set of outgoing windings and a set of balancing windings, a metallic supervisory circuit for said incoming trunk normally established through said incoming windings and said outgoing windings, and means for modifying said incoming trunk supervisory circuit to include said incoming windings only and to establish a second metallic supervisory circuit from said outgoing trunk including said outgoing windings only.

3. In a telephone system, a trunk circuit, a four-wire trunk incoming to said trunk circuit, a two-wire trunk outgoing from said trunk circuit, a hybrid coil for constituting a talking connection between said incoming trunk and said outgoing trunk, said hybrid coil having a set of incoming windings, a set of outgoing windings and a set of balancing windings, an incoming supervisory relay, an outgoing supervisory relay, means for normally connecting said incoming trunk through said incoming and outgoing windings to said incoming supervisory relay, registering devices, means under the control of said incoming supervisory relay to connect said incoming trunk with one of said registering devices, means responsive to said connection to disconnect said incoming supervisory relay from said incoming trunk, and means under the control of said registering device for connecting said incoming trunk to said incoming supervisory relay independent of said outgoing windings, for connecting said outgoing windings to said outgoing trunk and said outgoing supervisory relay and to disconnect said registering device.

4. In a telephone system, a trunk circuit, a four-wire trunk incoming to said trunk circuit, a two-wire trunk outgoing from said trunk circuit, a hybrid coil for constituting a talking connection between said incoming trunk and said outgoing trunk, said hybrid coil having a set of incoming windings, a set of outgoing windings and a set of balancing windings, a metallic supervisory circuit for said incoming trunk normally established through said incoming windings and said outgoing windings, registering devices, means controlled over said incoming trunk supervisory circuit to connect said incoming trunk with one of said registering devices, and means under the control of said registering device for modifying said incoming trunk supervisory circuit to include said incoming windings only, to establish a second metallic supervisory circuit from said outgoing trunk including said outgoing windings only and to disconnect said registering device.

5. In a telephoning system, a trunk circuit, a four-wire trunk incoming to said trunk circuit, a two-wire trunk outgoing from said trunk circuit, a hybrid coil for constituting a talking connection between said incoming trunk and said outgoing trunk, said hybrid coil having a set of incoming windings, a set of outgoing windings and a set of balancing windings, an incoming supervisory relay, an outgoing supervisory relay, means for normally connecting said incoming trunk through said incoming and outgoing windings to said incoming supervisory relay, registering devices, means under the control of said incoming supervisory relay to connect said incoming trunk with one of said registering devices through said incoming windings and said outgoing windings, means responsive to said connection to disconnect said incoming supervisory relay from said incoming trunk, and means under the control of said registering device for connecting said incoming trunk to said incoming supervisory relay independent of said outgoing windings, for connecting said outgoing windings to said outgoing trunk and said outgoing supervisory relay and to disconnect said registering device.

6. In a telephone system, a trunk circuit, a four-wire trunk incoming to said trunk circuit, a two-wire trunk outgoing from said trunk circuit, a hybrid coil for consituting a talking connection between said incoming trunk and said outgoing trunk, said hybrid coil having a set of incoming windings, a set of outgoing windings and a set of balancing windings, a metallic supervisory circuit for said incoming trunk normally established through said incoming windings and said outgoing windings, registering devices, means controlled over said incoming trunk supervisory circuit to connect said incoming trunk supervisory circuit with one of said registering devices, and means under the control of said registering device for modifying said incoming trunk supervisory circuit to include said incoming windings only, to establish a second metallic supervisory circuit from said outgoing trunk including said outgoing windings only and to disconnect said registering device.

ROBERT B. CURTIS.

REFERENCES CITED

The following references are of record in the file of this patent:

UNITED STATES PATENTS

| Number | Name | Date |
|---|---|---|
| 2,145,095 | Pfleiderer | Jan. 24, 1939 |